(12) United States Patent
Doig

(10) Patent No.: US 8,261,777 B2
(45) Date of Patent: Sep. 11, 2012

(54) DUCK BEAK VALVE

(76) Inventor: Ian D. Doig, Dora Creek (AU)

( * ) Notice: Subject to any disclaimer, the term of this patent is extended or adjusted under 35 U.S.C. 154(b) by 43 days.

(21) Appl. No.: 12/891,099

(22) Filed: Sep. 27, 2010

(65) Prior Publication Data

US 2011/0061756 A1  Mar. 17, 2011

Related U.S. Application Data

(62) Division of application No. 11/911,115, filed as application No. PCT/AU2006/000482 on Apr. 11, 2006, now Pat. No. 7,832,431.

(30) Foreign Application Priority Data

Apr. 12, 2005 (AU) .............................. 2005901805
May 23, 2005 (AU) .............................. 2005902616

(51) Int. Cl.
F16K 15/14 (2006.01)
(52) U.S. Cl. .......................................... 137/853; 251/57
(58) Field of Classification Search .................. 137/846, 137/847, 850, 843, 494, 853, 877, 860; 251/5, 251/175, 57
See application file for complete search history.

(56) References Cited

U.S. PATENT DOCUMENTS

| | | |
|---|---|---|
| 3,387,624 A | 6/1968 | Roland |
| 3,479,001 A | 11/1969 | Dower |
| 3,494,588 A | 2/1970 | Kisling |
| 3,951,572 A | 4/1976 | Ray, Jr. et al. |
| 3,984,080 A | 10/1976 | Varis et al. |
| 4,111,391 A | 9/1978 | Pilolla |
| 4,135,550 A | 1/1979 | Andersson |
| 4,344,743 A | 8/1982 | Bessman |
| 4,382,582 A | 5/1983 | Seki |
| 4,492,253 A | 1/1985 | Raftis |
| 4,607,663 A | 8/1986 | Raftis et al. |
| 4,630,635 A | 12/1986 | Bernstein et al. |
| 5,205,325 A | 4/1993 | Piper |
| 5,535,983 A | 7/1996 | Hohermuth |
| 5,570,715 A | 11/1996 | Featheringill et al. |
| 5,931,197 A | 8/1999 | Raftis et al. |
| 5,931,648 A | 8/1999 | Del Canizo |
| 6,575,425 B1 | 6/2003 | Betz |
| 6,585,005 B1 | 7/2003 | Raftis et al. |
| 6,695,733 B2 * | 2/2004 | Knutson ....................... 474/260 |
| 6,953,059 B2 | 10/2005 | Raftis |

FOREIGN PATENT DOCUMENTS

FR  2250932  6/1975
JP  61053470  3/1986

* cited by examiner

*Primary Examiner* — John Fox
(74) *Attorney, Agent, or Firm* — Coats & Bennett, P.L.L.C.

(57) ABSTRACT

A duck beak valve and/or pumps/pump systems that use such a valve are disclosed. The valve may include a flexible tube having an inlet portion and an outlet portion and a spigot having a spigot inlet portion and a spigot outlet portion. The inlet portion of the flexible tube is sealed relative to the spigot. Inner surfaces of the flexible tube outlet portion downstream of the spigot outlet portion close together when the valve is closed. At least one reinforcement engages the flexible tube and is adapted to pivot at an inlet end so that an outlet end of the reinforcement moves toward and away from a centerline of the flexible tube. The reinforcement reinforces the flexible tube against an externally applied backpressure when the outlet end of the reinforcement is disposed toward the centerline and the valve is closed.

9 Claims, 14 Drawing Sheets

DUCK BEAK VALVE

This application is a divisional of application Ser. No. 11/911,115, filed 10 Oct. 2007, which is a §371 national phase of PCT/AU2006/000482, filed 11 Apr. 2006, which claims priority from Australian Provisional Patent Application No. 2005901805 entitled "A slurry valve and applications" filed 12 Apr. 2005 and from Australian Provisional Patent Application No. 2005902616 entitled "FT valves and applications" filed 23 May 2005, the entire contents of all of which are incorporated herein by reference.

BACKGROUND

This invention relates to improvements in valves and pumps; in particular to improvements in pinch valves and to an improved pump incorporating features of such an improved valve.

A pinch valve typically consists of a flexible resilient cylindrical elastomeric sleeve disposed in a valve body in the form of a continuous tube, sleeve or the like, together with a means to constrict the sleeve so as to control or stop the flow of fluid through the pipe. Typically the sleeve is concentrically located within a rigid outer valve housing and suitable means are provided to impress a fluid under pressure between the sleeve and the rigid valve housing so that the sleeve is squeezed inwards and deformed or collapsed to provide a restricted fluid flow passage. The impressed fluid is typically a gas or liquid under pressure. When that pressure is released, the resilience of the elastomeric tube is relied upon to open the valve. The elastomeric sleeve typically comprises a fabric reinforcement embedded in synthetic rubber to support the valve closure against the introduced pressure. Higher valve delivery pressure capacity and the need for adequate resilience in the tube to induce suction at the valve inlet when opening, require increasing layers of fabric reinforcement and increased wall thickness for the tube. This leads to a consequent loss of flexibility to the point where the required wall thickness may become impractical for use as a pinch valve.

A duck-beak valve is a check valve form of the pinch valve that is closed in its relaxed condition with the outlet end of the sleeve unattached to the valve body. The fluid transiting the valve surrounds the inside and the outside of the sleeve, which opens when the valve inlet pressure sufficiently exceeds the valve outlet pressure.

The alternative use of flap type check valves have the problem that they are vulnerable to being held open by the entrapment of solids between the flap and the valve seat.

Thus, while a number of valve designs have been proposed, there remains a need for alternative designs.

It should be noted that any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this application.

SUMMARY

The present invention provides an improved duck beak valve and pumps and/or pump systems that use such a valve. In one embodiment, the duck beak valve comprises a flexible tube having an inlet portion and an outlet portion and a spigot comprising a spigot inlet portion and a spigot outlet portion. The inlet portion of the flexible tube is sealed relative to the spigot. Inner surfaces of the flexible tube outlet portion downstream of the spigot outlet portion close together when the valve is closed. At least one reinforcement engages the flexible tube and is adapted to pivot at an inlet end so that an outlet end of the reinforcement moves toward and away from a centerline of the flexible tube. The reinforcement reinforces the flexible tube against an externally applied backpressure (higher pressure at the outlet end of the valve than at the inlet end of the valve) when the outlet end of the reinforcement is disposed toward the centerline and the valve is closed.

The spigot outlet portion may comprises one or more inclined surfaces against which the flexible tube abuts when the valve is closed in the presence of backpressure. The reinforcement may be a stiff member and may further comprise stiff plate disposed outwardly of the flexible tube and coupled to move therewith. The reinforcement may comprise a plurality of reinforcing spokes disposed in the flexible tube. The reinforcing spokes may comprise bars with ball-joint elements at one end thereof that pivot in corresponding sockets associated with the spigot outlet portion. A shoe may be associated with each reinforcing spoke, with the shoe moving with the corresponding spoke and the flexible tube. The shoe may be disposed between a tip of the corresponding spoke in the outlet direction and the flexible tube. The optional shoes provide an enlarged area over which forces from an externally applied backpressure are distributed when the valve is closed. Clamps may be provided that bias the outlet portion of the flexible tube to a closed position, with the clamps clamping each lateral side of the flexible tube together, but allowing expansion of the central part of the tube.

The various aspects of the various embodiments may be used alone or in any combination, as is desired.

DETAILED DESCRIPTION

Figure 1:
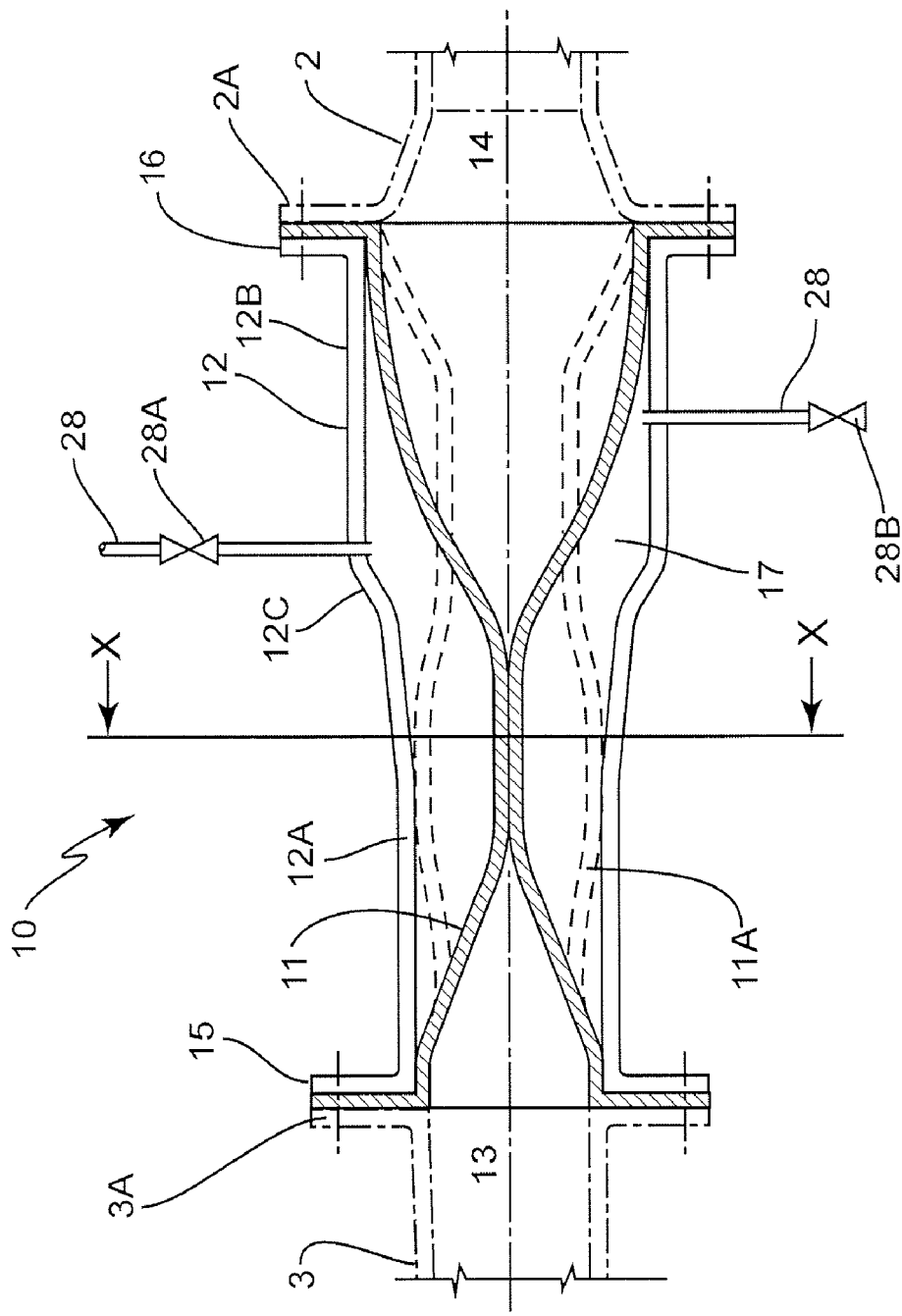
FIG. 1 is a schematic side view of a valve, partly shown in cross section.

Referring to the drawings, FIG. 1 shows a side view in cross section of a check valve 10 sealingly bolted between an outlet pipe 2 and an inlet pipe 3. The valve 10 comprises a hollow generally cylindrical housing in the form of a valve body 12 defining flanged ends 15 and 16. A flexible tube 11 is shown in the closed position with flanged ends sealingly clamped between the faces of the flanges 15 and 16 at the inlet and outlet ends of the valve body respectively and the flanges 2A of the outlet pipe 2 and 3A of the inlet pipe 3, as shown. The flexible tube 11 typically comprises a fabric reinforcement embedded in rubber although other materials could be used to provide the required degree of flexibility and fatigue resistance. It is to be noted that the outlet diameter 12B or girth of the valve body 12 is greater than the inlet diameter or girth 12A, with the diameter increasing at an angled step portion 12C.

As can be seen, an enclosed space 17 is formed between the outer walls of the tube 11 and the interior of the valve body 12. Tubes 28, controlled by valves 28A and 28B, are provided to allow fluid to enter, or be withdrawn from, the enclosed space 17 during servicing of the valve. However, it is to be noted that these valves 28a and 28b can be and are fully closed in use, to prevent ingress or egress of the fluid from the enclosed space 17. The opening and closing of the valve 10 is not dependent on the entry or egress of fluid along the tubes 28.

In use, the enclosed space 17 is filled with a substantially incompressible non-volatile gas free liquid through pipes 28 and sealed. FIG. 1 shows the valve in the closed position in which the flexible tube 11 is pinched closed and fluid is prevented from passing from the inlet 13 to the outlet 14. Specifically, the tube is pinched and closed adjacent its inlet region 13 and expanded adjacent its outlet region 14 where the diameter of the valve body is greater and the flexible tube is expanded.

When the pressure at the outlet 14 is larger than the pressure at the inlet 13, the walls of the flexible tube adjacent the outlet 14 expand/are pushed outwards displacing the liquid in the enclosed spaced 17 towards the inlet and pinching or squeezing the walls of the flexible tube together adjacent the inlet. This state is shown in FIG. 1. However, when the pressure at the inlet 13 is larger than that at the outlet, the walls of the flexible tube in the inlet region 13 are forced outwards towards the valve body, and this displaces or pushes the liquid in the enclosed space towards the outlet 14. However, the walls of the flexible tube are unable to close adjacent the outlet area 14 because the girth of the valve body and flexible tube is greater than that in the inlet region. Because the amount of liquid in the enclosed space remains unchanged the valve is opened, as shown in the ghost outline 11A of the flexible tube. Thus a valve is provided which opens and closes automatically according to the differential pressure at the inlet and outlet of the valve. There are no moving parts. The valve does not require actuation and opens and closes solely based on the pressure differential.

A first alternative to the enlargement of the girth 12B of the flexible tube at the outlet is to have the length of the flexible tube in its outlet regions sufficiently longer than in its inlet regions so that the liquid displaced when the valve is opening does not close the outlet regions of the flexible tube, and for the walls in its inlet region (where the pinch occurs) to be to more flexible than elsewhere. A second alternative to the enlargement of the flexible tube girth is to construct the flexible tube so that in its relaxed state the flexible tube shape is the pinched shape of the fully closed flexible tube shown in FIG. 1.

Figure 2:
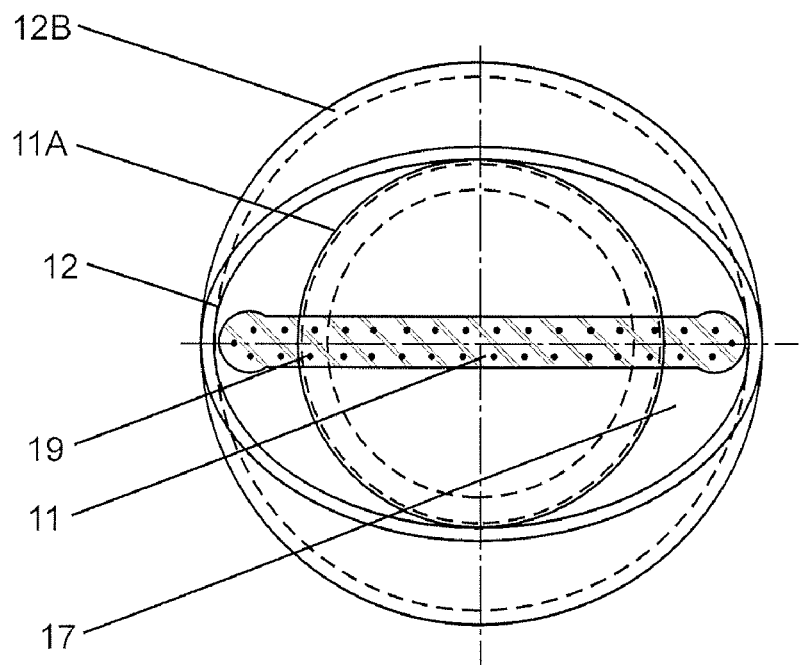
FIG. 2 is an end view in cross section of the valve of FIG. 1 in the directions of the arrows X-X.
Figure 3:
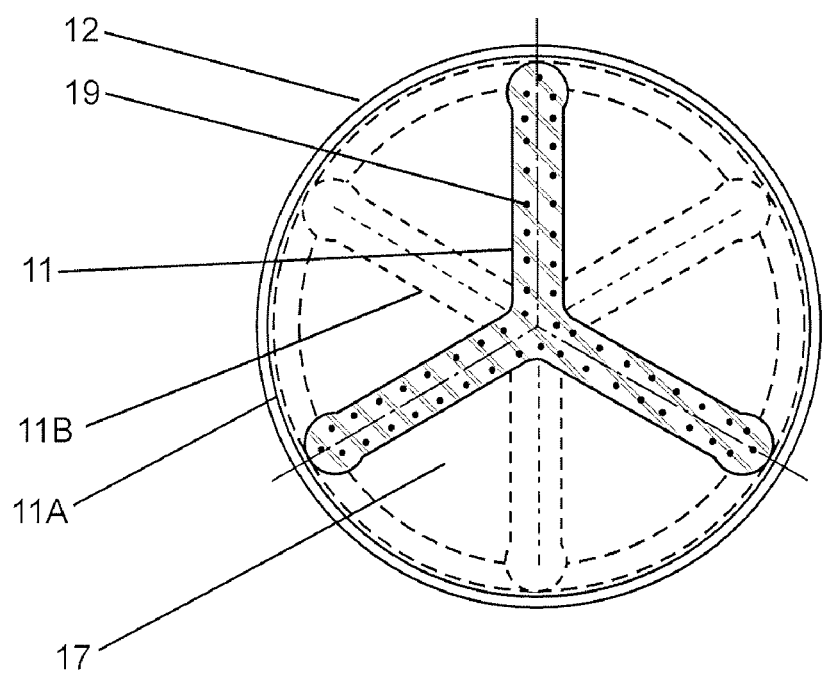
FIG. 3 is an alternative end view in cross section of the valve of FIG. 1 in the direction of the arrows X-X.

FIGS. 2 and 3 show two different end views in cross section of the check valve 10 of FIG. 1 in the direction of arrows X-X. Like numerals indicate features in common with FIG. 1.

FIG. 2 shows the flexible tube closed and flattened between two lobes. To accommodate this shape the body 12 is elliptical in the region of the flexible tube closure, which limits the range of locations for the lobes. To accommodate a range of lobe locations around the full circle the body shape in the region of the flexible tube closure has to be round as shown by the broken lines 12B.

FIG. 3 shows the flexible tube closed and flattened between three lobes to form a star shape. To accommodate this shape the body 12 needs be only slightly larger in diameter in the region of the flexible tube closure than the body diameter at the inlet 13 and outlet 14. The lobes can be located anywhere around the circle, and the broken outline 11B shows one alternative position.

Figure 4:
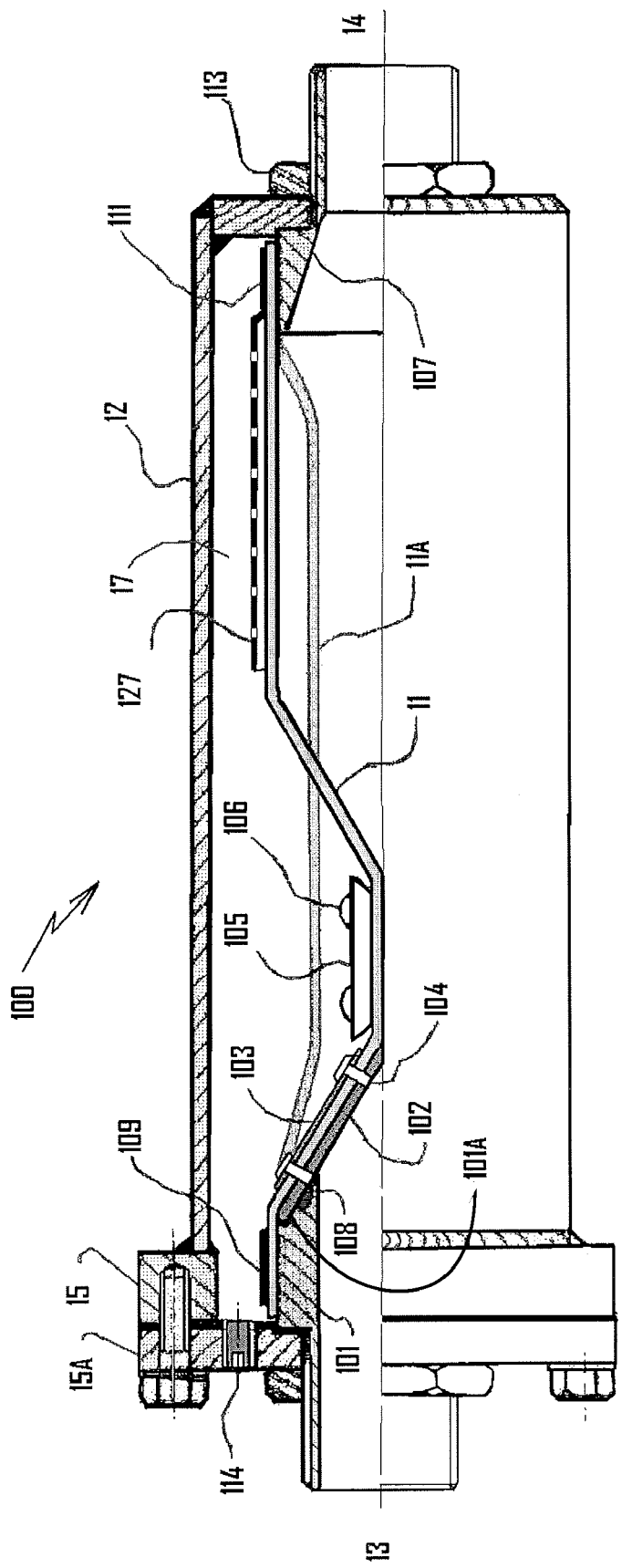
FIG. 4 shows a side view in half cross section of an alternative embodiment of a check valve.
Figure 5:
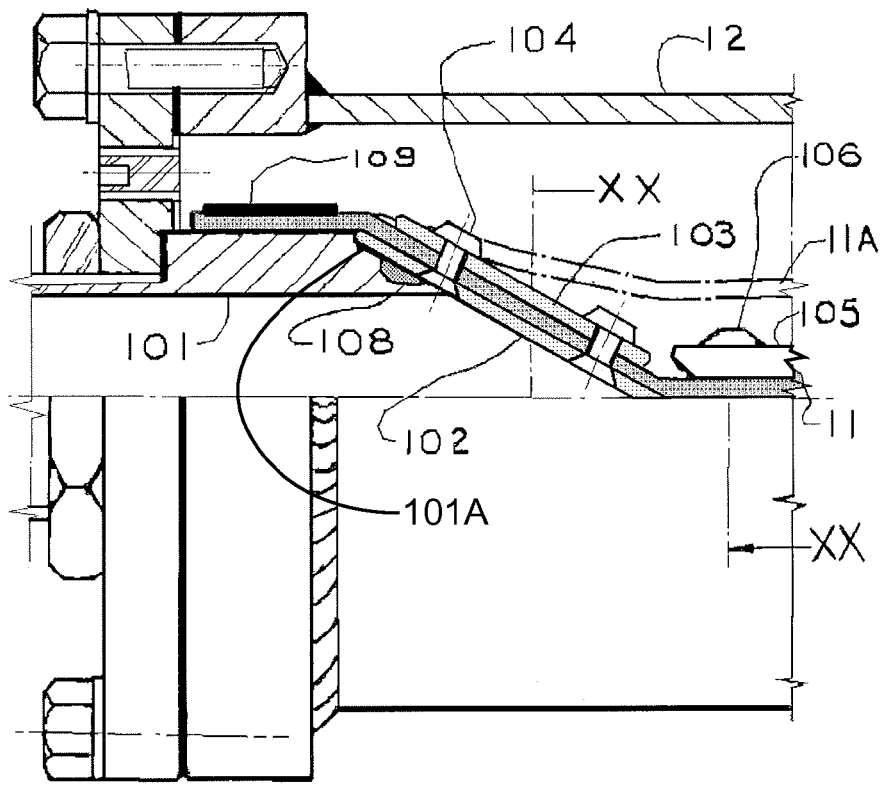
FIG. 5 is an enlargement of the inlet section of FIG. 4.
Figure 6:
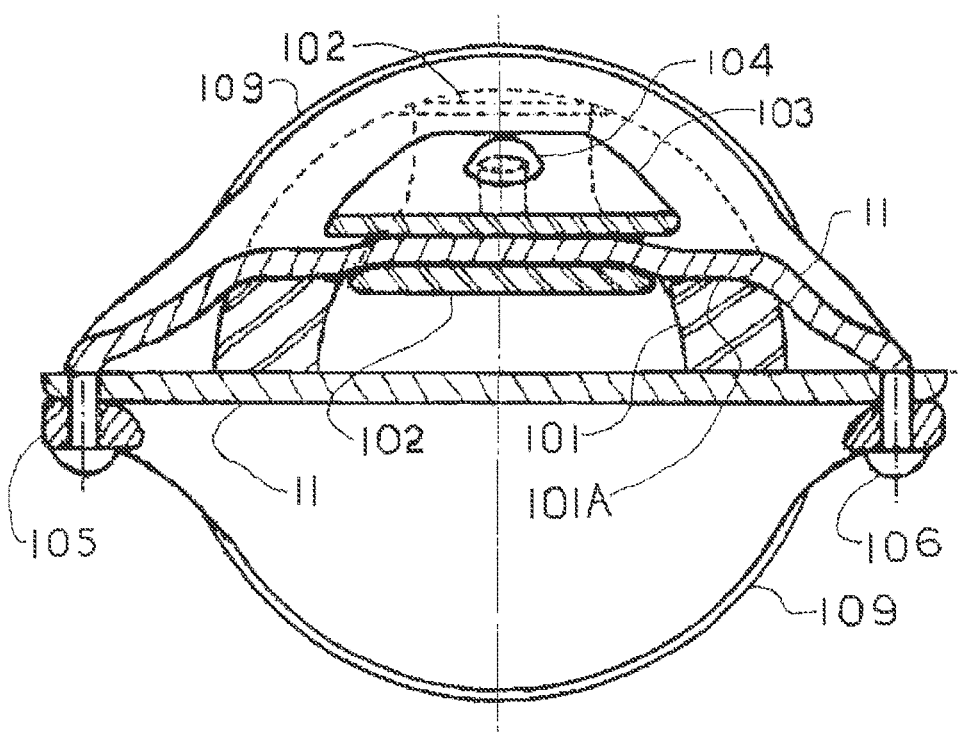
FIG. 6 is an end view in cross section looking in the direction of the arrows XX-XX of FIG. 5.

FIGS. 4 to 6 show an alternative check valve 100 in which like numerals indicate features in common with FIG. 1. In FIGS. 4 to 6 the flexible tube 11 is a straight tube with parallel walls of larger bore than that of the inlet and outlet spigots 101 and 107. The flexible tube 11 is typically formed from synthetic rubber and reinforced with a strong, but flexible, embedded woven fabric. The flexible tube 11 is sealingly clamped at its inlet and outlet ends around the spigots 101 and 107 by clamping straps 109 and 111. The flexible tube is a "lay flat" tube that may be rolled up, but expands to a circular shape/cross-section when filled with liquid and comprises nitrile rubber reinforced with fine Dacron fibers, although as discussed below, other materials may be used for the flexible tube.

The flexible tube 11 is narrowed over the squeezed section by pairs of stiff clamping bars 105 that permanently clamp each side of the flexible tube by the fasteners 106. They do not clamp the center of the tube. This clamping of the sides biases the flexible tube flat with its inner walls pressed together over the clamped length as shown in FIG. 6, until the valve inlet pressure exceeds the valve outlet pressure sufficiently to open the valve. This arrangement also minimizes deformations of the tube as it flexes, and may thus extend the service life of the tube. Alternatively, stitching may be substituted for the clamping bars 105. Note that the valve-open flow area through the clamped parts is reduced by the clamping bars 105.

The outlet end spigot 107 has a conical inlet, but the inlet end spigot 101 is cut as shown to provide flat surfaces 101A that support the flexible tube against externally applied pressure when the valve is closed. Additional support is provided by the stiff members 102, which are attached to the inner wall of the flexible tube by the rivets 104 and outer stiff plate 103. Stiff members 102 pivot about a groove at the inlet end of each flat surface 101A. Entry of debris between the stiff member 102 and the spigot 101 as the valve opens is prevented by the expansion of sponge rubber insert 108. Excursions towards flattening of the flexible tube 11 in its outlet regions is limited by the stiff tube 127, which is perforated.

Flange 15, bolted cover plate 15A and the securing nuts 113 allow the flexible tube to be sealingly encased within valve body 12, and allow for easy dismantling for flexible tube replacements. A sealed screwed plug 114 allows access to the enclosed space 17 for adjusting the liquid inventory.

FIGS. 5 and 6 also provide an example of an alternative duck-beak type of pinch valve wherein like numbered items obtain the same description as FIG. 4.

Figure 7:
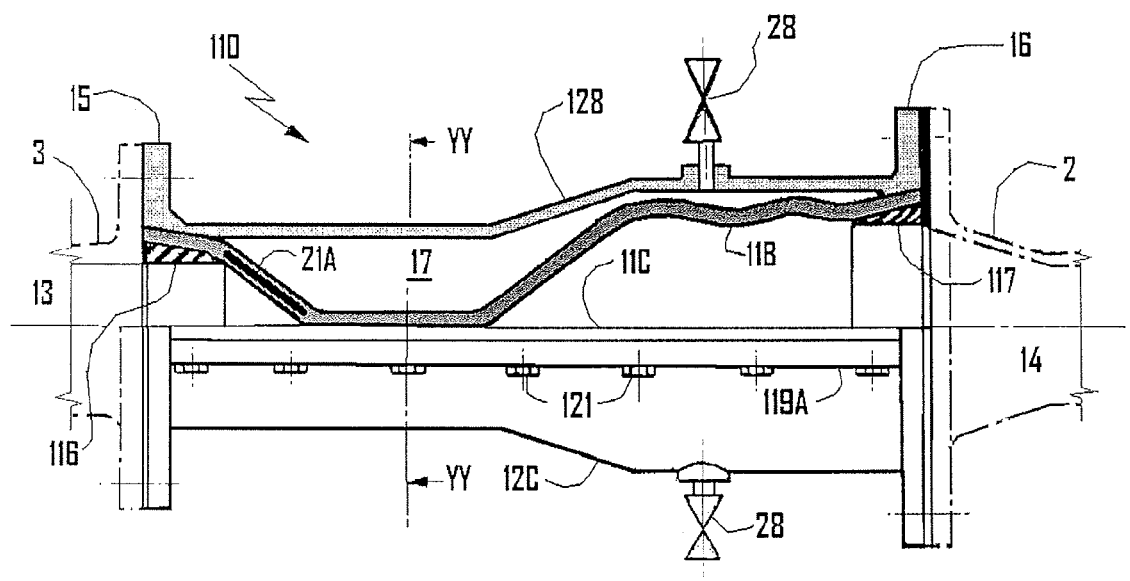
FIG. 7 shows a side view in half cross section of a further embodiment of a check valve.
Figure 8:
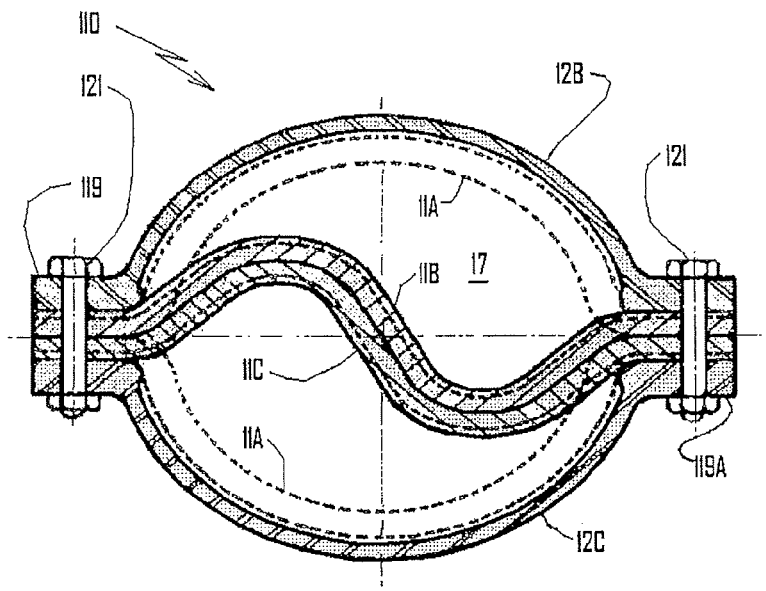
FIG. 8 is an end view in cross section looking in the direction of the arrows YY-YY of FIG. 7.

FIGS. 7 and 8 show two half-flexible tube diaphragms 11B and 11C partly inflated with liquid so that when the check valve is closed (as shown) the two half-flexible tube diaphragms 11B and 11C are locally squeezed sealingly together downstream of the inlet 13 parts of the valve (to close the valve), and inflated upstream of the outlet 14 parts of the valve. The two half-flexible tube diaphragms 11B and 11C are sealingly clamped at each side of the flexible tube check valve between the flanges 119 and 119A of the chamber inner walls 12B and 12C by the bolts 121.

When the flexible tube check valve 110 is open, the position of the upper half-flexible tube diaphragm is shown by the dotted lines 11A (refer to FIG. 8). The inlet and outlet ends of each half-flexible tube diaphragm 11B or 11C are sealingly clamped between the stiff conical insert 117 and the conical chamber inner walls 12B and 12C at the outlet 14, and between the stiff conical insert 116 and the conical chamber inner walls 12B and 12C at the inlet 13. Valves 28 (normally sealed) allow liquid to enter or be withdrawn from the sealed spaces 17. These valves 28 can also allow the admission or extraction of fluid when the valve 110 is being used other than as a check valve.

In FIG. 8 the two half-flexible tube diaphragms 11B and 11C form an S shape in the closed position. Their shape in the open position is shown by the dotted lines 11A. Like numerals indicate features in common with FIG. 1.

As described for the check valve shown in FIGS. 4 to 6, the flexible tube immediately downstream of the inlet 13 must support the pressure at the outlet 14, which is transmitted by the liquid in enclosed space 17. In FIG. 7 reinforcement is provided by a series of closely-spaced rods 21A, embedded in the flexible tube 11B and 11C. Rods 21A pivot within the flexible tube at their inlet end, where they are supported by the conical insert 116.

Figure 9:
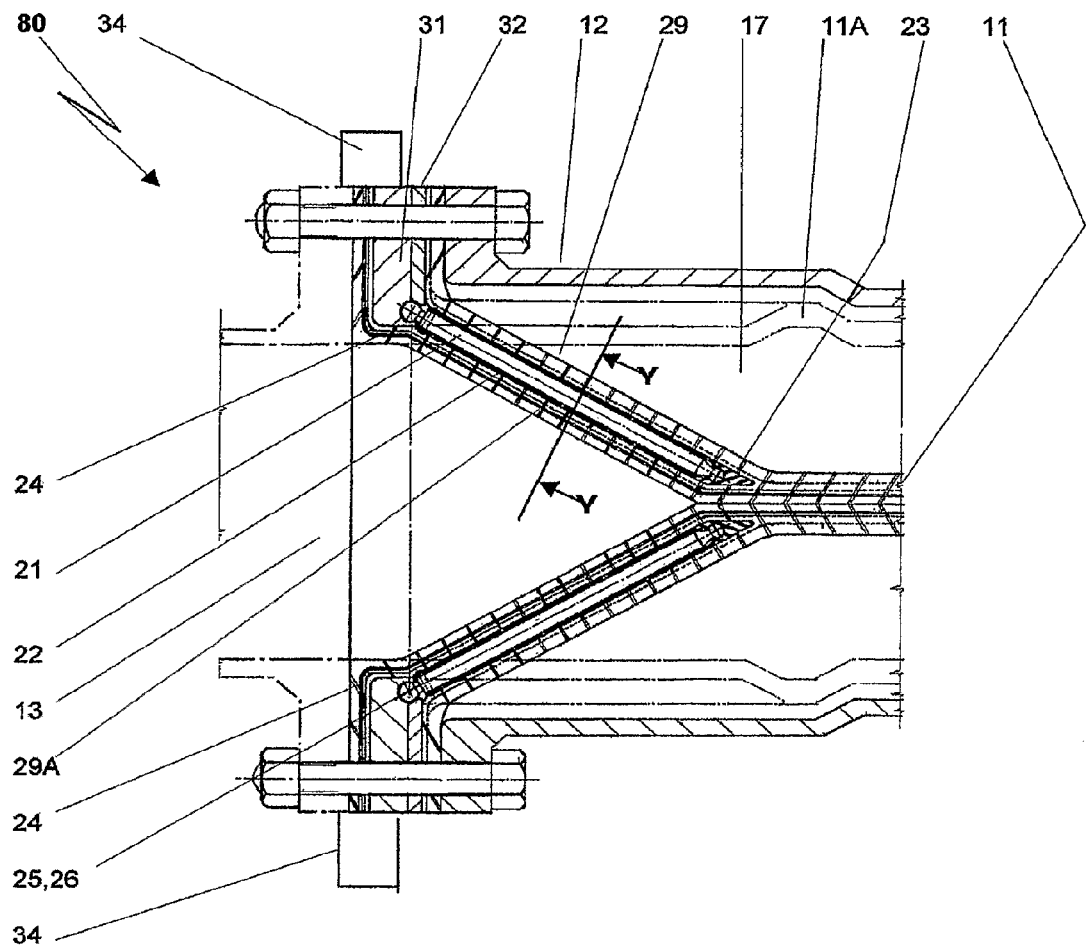
FIG. 9 is a side view in cross section of a reinforcement system for the inlet section of a valve.
Figure 10:
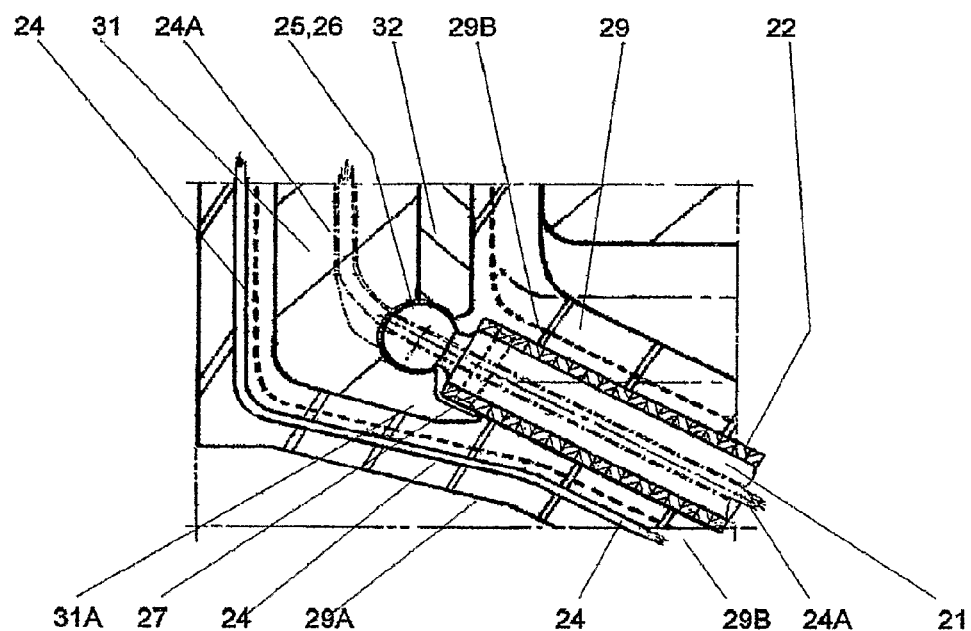
FIG. 10 is an enlargement of part of FIG. 9.
Figure 11:
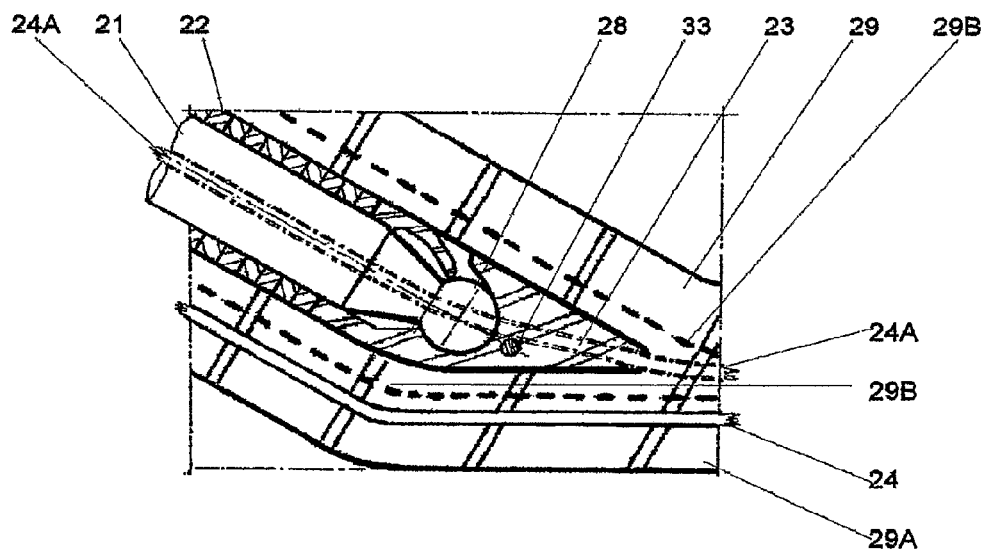
FIG. 11 is an enlargement of another part of FIG. 9.

FIGS. 9 to 11 show a side view in cross section of the inlet section of a duck beak check valve or valve of FIG. 1 where a reinforcing spokes and cage unit is inserted.

In FIGS. 9 to 11, the reinforcing spokes 21 are round section steel bars with ball joint elements at both the inlet and outlet ends. Each spoke rotates about its ball 25 in a socket 26 located in the annular support ring 31, and each spoke rotates towards the flexible tube axis when moving to the valve fully closed position (as shown), and rotates away from the flexible tube axis when opening to the full-open position shown by the ghost outline 11A. The retaining ring 32 holds the balls 25 in their sockets 26. The annular support ring 31 and its sockets 26 restrict the inlet end of the reinforcing spokes and cage unit 20 to a circular shape, but the other end of the cage unit 20 can adopt any shape not restricted by either the ligaments and cables 24, or by the extension 31A of the ring 31, or the walls of the valve body 12.

Inwards rotation of any spoke past the axis when closing is restricted by the system of ligaments or cables 24, and by the extension 31A of the ring 31 on the inside of the spokes 21. The length of each ligament or cable 24 is adjusted and fixed manually and anchored by an external device 34 before it begins operating. External devices 34 are located adjacent to the inlet and outlet ends of the flexible tube valve, and can be a device of the prior art such as the wedged rotatable posts used to adjust the tension in stringed musical instruments. Each ligament or cable 24 operates within a tubular sheath that protects the rubber parts of the flexible tube 11 from abrasion. The tubular sheath may be a wound tubular helix like those used in vehicle cable brake systems provided it does not itself overly restrict radial movements of the flexible tube.

A collar 27 is pinned around each spoke at its inlet end, and a shoe 23 is attached to the other end of each spoke. Each shoe is attached to the ball end of its spoke by a "spring-closing" device as shown. The collar 27 and shoe 23 on each spoke 21 confine the links 22 to the region between the collar and the shoe 23.

Where FIGS. 9, 10 and 11 provide an example of a duck-beak type of pinch valve the cable 24 and external device 34 are omitted.

FIGS. 10 and 11 show an alternative conduit 24A for the ligaments or cables 24 that passes through the spokes 21. The two ends of each of these alternatively located ligaments or cables 24A connect to similar external devices. Note that the tubular sheath and conduits for the ligaments and cables must provide adequate room for the ligaments or cables to squirm when the flexible tube is in its open position. Note also that an alternative cylindrical shape, or hinge may be substituted for the ball and socket pivots 25 and 26 shown.

Figure 12:
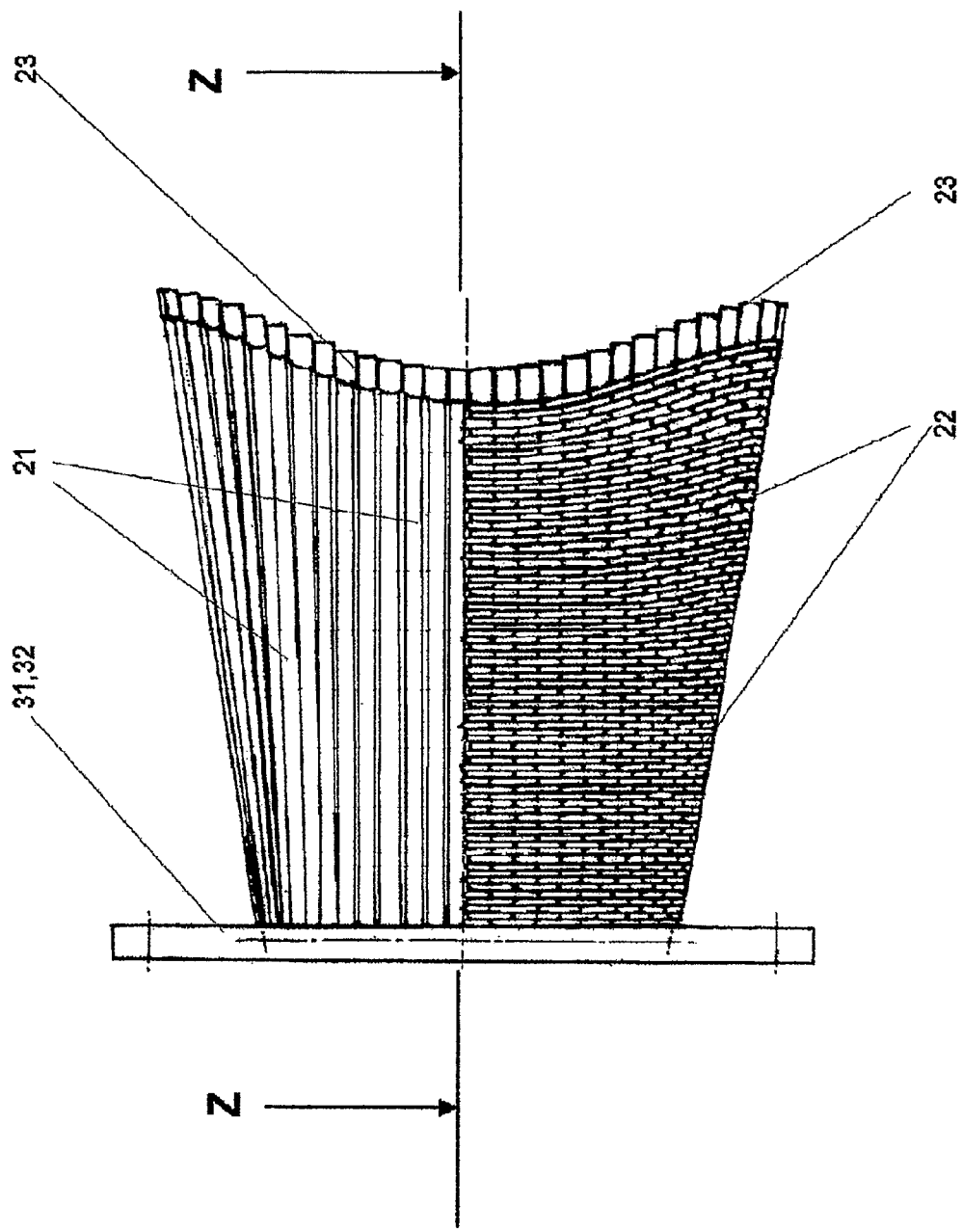
FIG. 12 is a plan view of spokes and links shown in FIG. 9.
Figure 13:
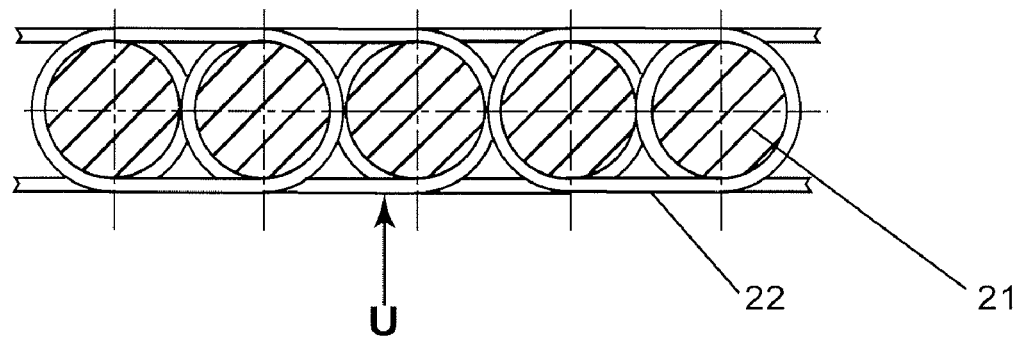
FIG. 13 is an alternative part end in cross section on the arrows Y-Y in FIG. 9 of some of the spokes of some spokes and links.

FIG. 12 shows a plan view of the spokes 21 and its cage in the flexible tube valve closed position. The bottom half of FIG. 13 shows the links 22 that link any two adjacent spokes 21. Each row of links link alternate pairs of spokes 21 to produce the "basket-weave" appearance shown. The top half of the plan view shows the spokes 21 with the links 22 removed, and provides an example of the rods 21 spaced within the fabric of the flexible tube without the addition of the links 22.

Figure 14:
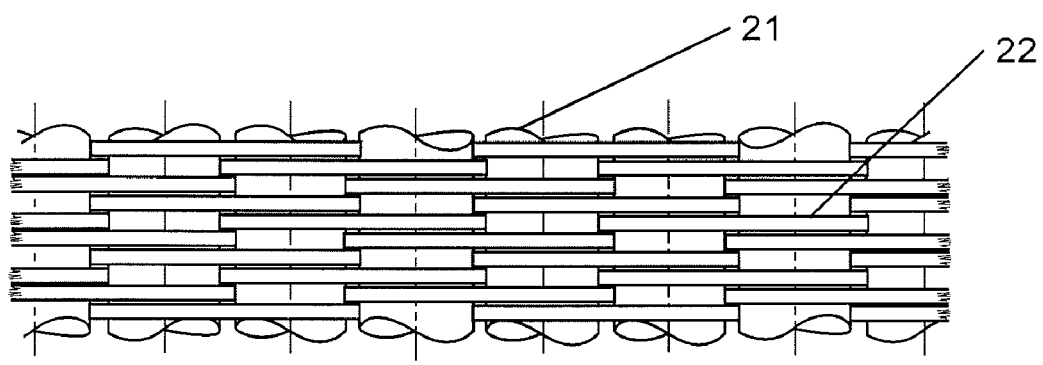
FIG. 14 is a plan view from the direction of arrow U in FIG. 13.
Figure 15:
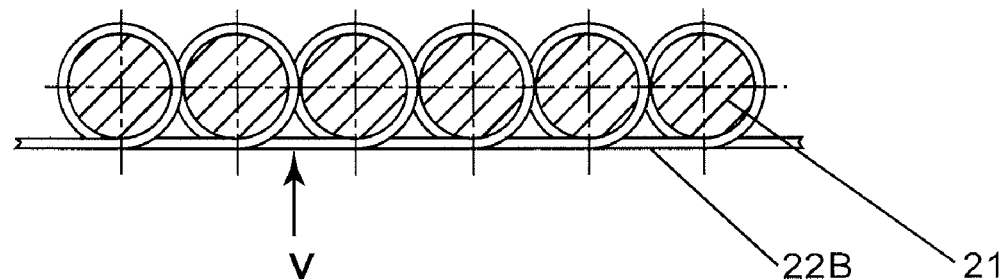
FIG. 15 shows an alternative to FIG. 13.
Figure 16:
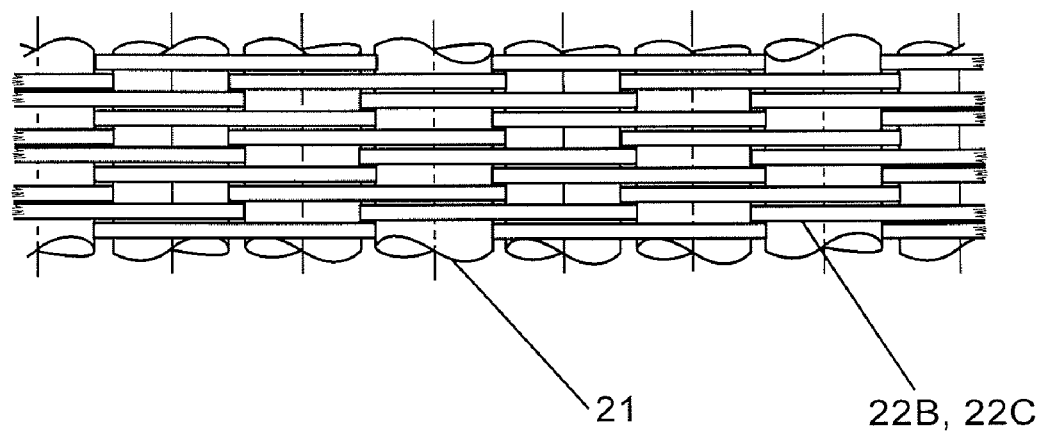
FIG. 16 shows an alternative to FIG. 14.

FIG. 13 is a part view in cross section on the arrows Y-Y in FIG. 9 showing a system of links 22 attached to link pairs of spokes 21 as shown. Like numerals indicate features in common with all previous figures. FIG. 14 is a plan view from the direction of the arrow U of FIG. 13 of part of the cage 20 showing how the links 22 of FIG. 13 are alternately positioned around successive pairs of spokes 21. FIGS. 15 and 16 provide details of alternative links 22B that are woven around spokes 21.

Figure 17:
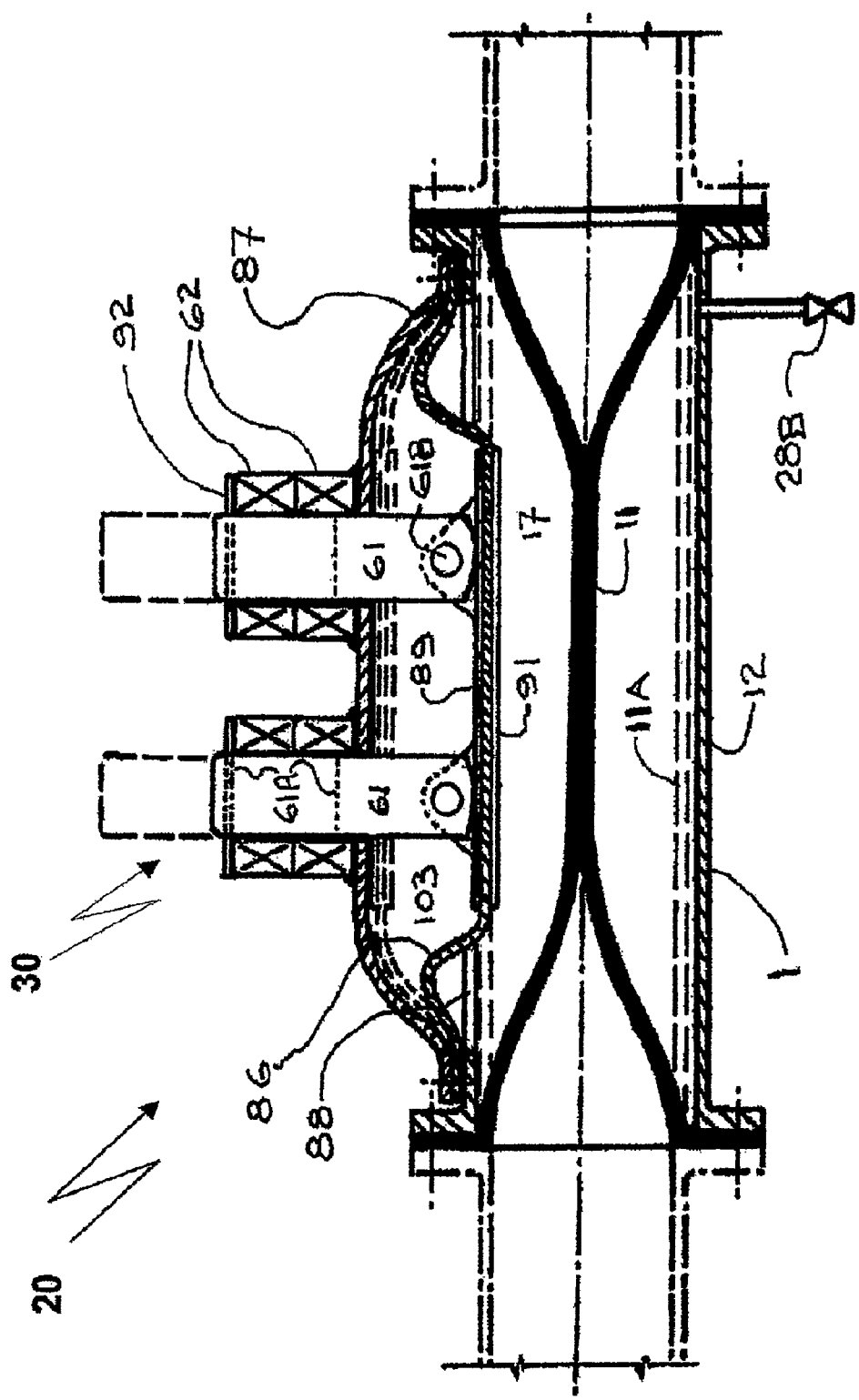
FIG. 17 is a side view part of which is shown in cross section of a valve having electromagnetically driven diaphragm for opening and closing the valve.

FIG. 17 is a side view in cross section of a pinch valve 20. Numbers that are common to FIGS. 1, 2 and 3 indicate components that have basically the same function, and obtain substantially the same description provided above for FIGS. 1, 2 and 3 except the girth of flexible tube 11 is substantially the same along its length. In FIG. 17 a drive unit 30 is directly attached to the valve body 12 of a pinch valve, and enclosed space 17 is filled with gas-free hydraulic liquid.

The electromagnetic drive mechanism 30 moves a diaphragm 86 that is sealingly clamped around its edges, between a flat surfaced flange 88 that extends from the valve body 12 around the periphery of the diaphragm 86, and a stiff cover 87. The diaphragm 86 is also clamped between two stiff plates 89 and 91 over its central regions as shown. The diaphragm 86 and the flange 88, and mating parts can be circular, elliptical, obround, or rectangular when viewed from above in plan.

Electromagnetically actuated solenoids 61, attached by hinges 61B to stiff plate 89 move diaphragm 86 towards the valve axis to close the valve, and away from the valve axis to open the valve. Appropriate energizing of the electromagnetic coils 62 moves both solenoids to close or open the valve. Each solenoid has a vertical slot 61A that allows the solenoid to slide about a guide pin 92 that limits the vertical movement of the solenoid between the valve open and closed positions. Coils 62, and pins 92 are securely attached to the cover 87 and space 103 is air filled and vented.

Figure 18:
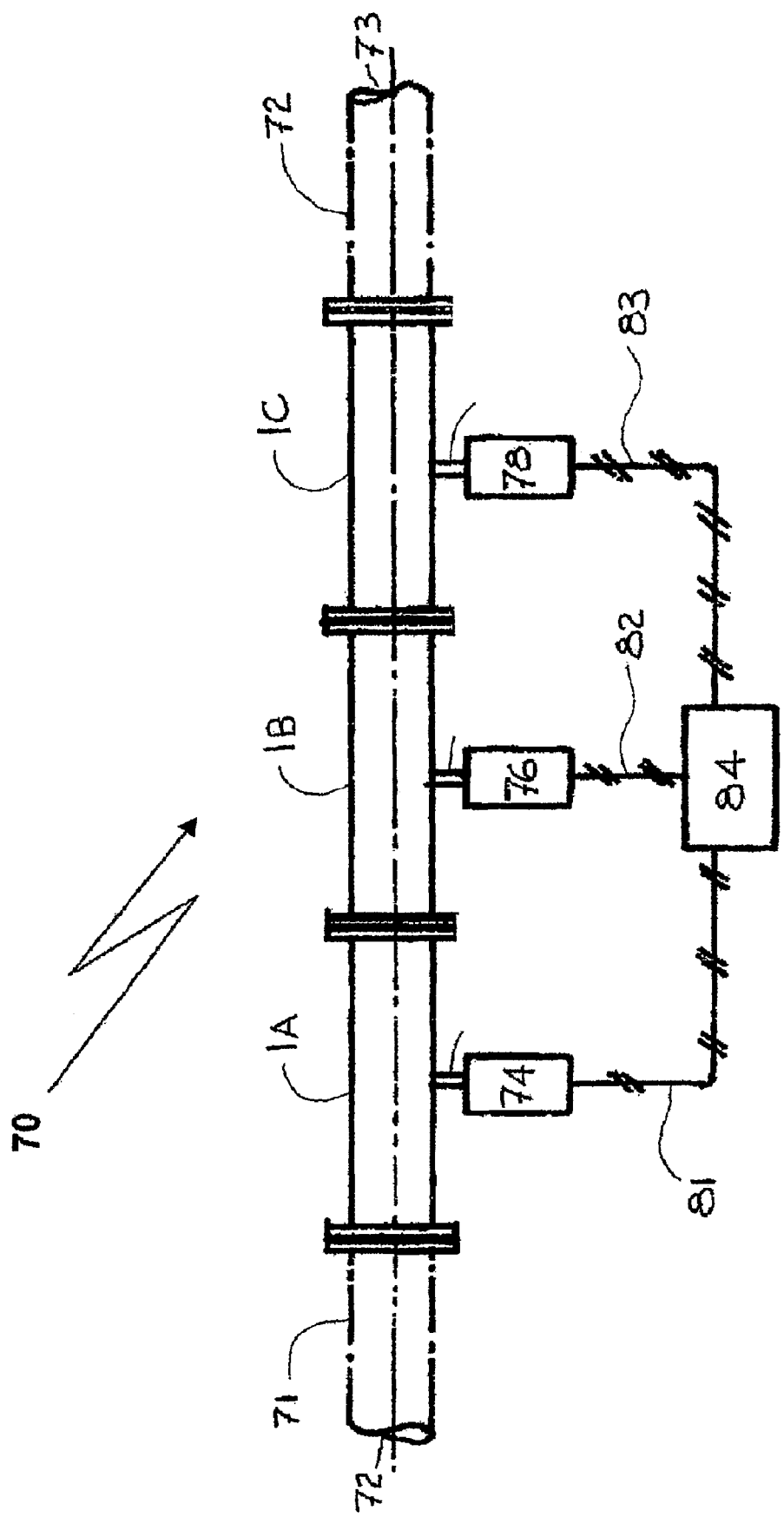
FIG. 18 is a schematic diagram illustrating three valves arranged to function as a pump.

FIG. 18 is a schematic showing a train of three pinch valves 1A, 1B and 1C fastened sealingly to each other at their mating inlet and outlet ends, and to an inlet pipe 71 and an outlet pipe 72 to form a pump 60 having three pinch valves as its pumping elements. Items 74, 76 and 78 are mechanical-, electromagnetic-, hydraulic-, or pneumatic driven mechanisms that change the confines of the enclosed space within the valve body of each pinch valve (exemplified by FIG. 17) to open or close it, or use the delivery or withdrawal of a gas or liquid into each enclosed space of a modified prior art pinch valve, to open or close it.

A feature of pinch valves used in these trains is that the axial length of each flexible tube 11 is at least one third longer than their girth, and each flexible tube is constructed to be most responsive to closing or opening downstream of its inlet end and progressively less responsive towards its outlet end, so that, while the valve is closing, inlet regions of the flexible tube are biased to be pinched closed while its downstream parts are still closing, and while the valve is opening inlet regions of the flexible tube will be biased to open while its downstream parts are still opening. A programmed controller 84 controls when each of the said drive units delivers fluid under pressure to, or withdraws fluid from, each pinch valve to close, or open it as required. Links 81, 82 and 83 communicate commands from the controller 84 to each drive unit 74, 76 and 78, (or where modified prior art pinch valves are used, deliver or release gas or liquid into or from enclosed space 17), in a sequence that opens or closes each of the pinch valves sequentially so that one of the pinch valves is at least part closed while parts of other valves in the train are open or opening. A sequence in which pinch valve 1A, and/or pinch valve 1B and/or pinch valve 10 are closed or closing (while pinch valve 1B, and/or pinch valve IC and/or pinch valve 1A respectively are opening or open) to provide a progressive induction of fluid into inlet 72, and delivery of that fluid through the outlet 73 in a repeating cycle is: {1A closed, 1B closing, 1C open}; {1B fully closed, 1C closing, 1A opening}; {1C fully closed, 1A open, 1B opening}; {1A closing, 1B open, 1C opening), with the cycle repeated, wherein the positions within { } are instantaneous periods in each cycle.

The train shown in FIG. 18 can be extended mutatis mutandis, to use more than three pinch valves operating in a programmed sequence and any train may have a check valve inserted at its inlet, or its outlet, or at both its inlet and outlets.

Figure 19:
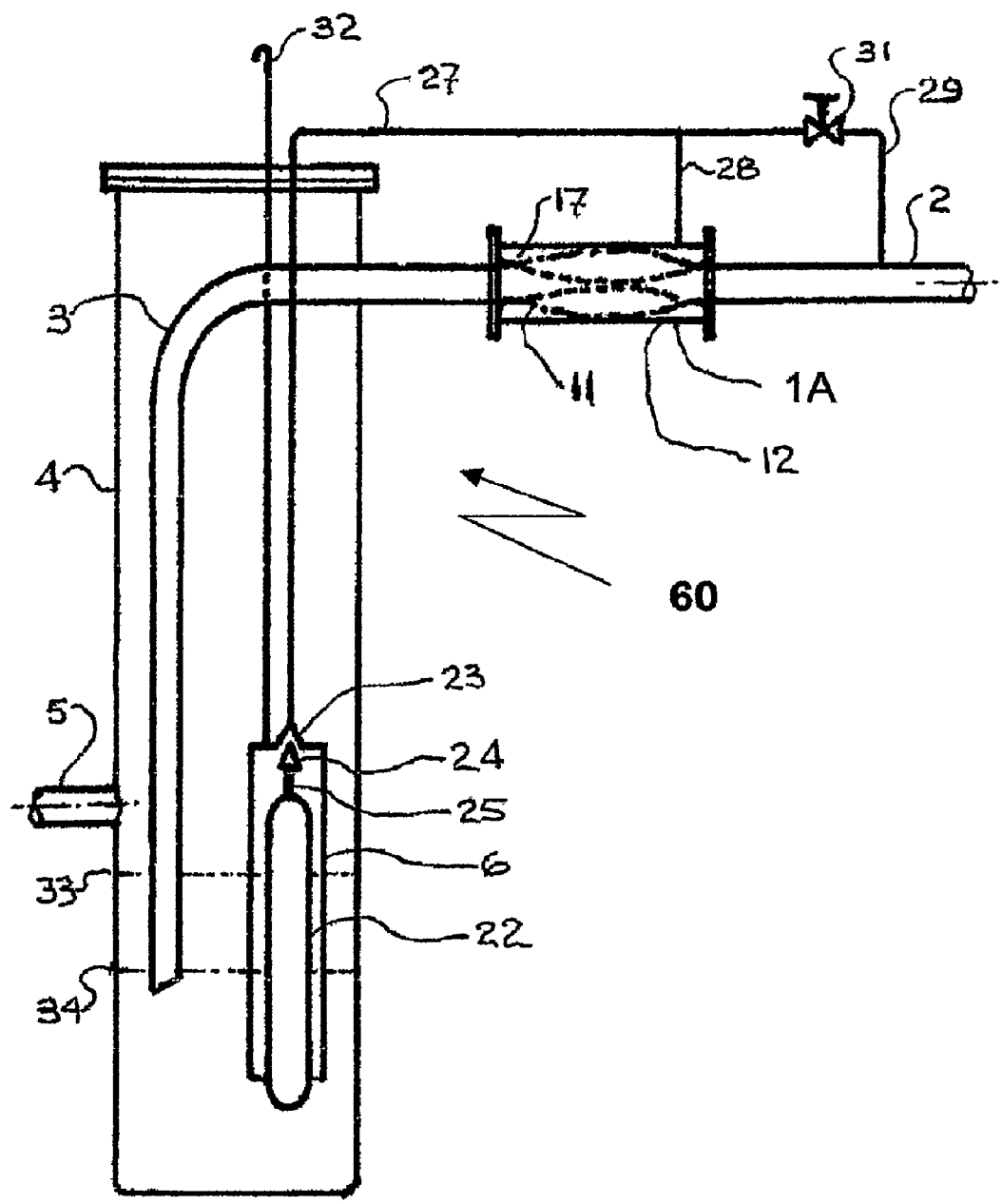
FIG. 19 is a schematic drawing showing a valve installed in a sub-atmospheric pressure driven sewer pipe.

FIG. 19 is a schematic diagram showing an example of an air pressure closing pinch valve applied to a vacuum-driven sewer system 60 where, like numerals indicate features in common with FIGS. 1 and 2. Waste water or sewage flows by gravity into well 4 through the sewer pipe 5 and accumulates in the base of the well 4. Tubes 27 and 28 connect the enclosed space 17 to the flow restricting valve 31 and the valve seat 23 at the top of float actuated valve unit 6. Valve unit 6 comprises a float 22 that has a valve 24 attached to a stem 25 at its top. Flow-restricting device 31, which can be a valve, or a tube of small bore, is placed between tube 27 and tube 29, which connects to the interior of the sewer pipe 2 at a point downstream of pinch valve 1A. Device 31 restricts the flow of air into conduit 29 induced by sub-atmospheric pressure in the sewer pipe 2. Pinch valve 1A opens when float 22 rises to level 33, when valve element 24 enters seat 23 and seals conduit 27. Air is withdrawn from conduits 27 and 28, and enclosed space 17 through the flow restriction 31, and pressure in the enclosed space 17 falls to the sub-atmospheric pressure within sewer pipe 2. As result, the outer walls of the flexible sleeve 11 inflate and pinch valve 1A opens: fluid can then flow freely through pinch valve 1A into sewer pipe 2. Periodic withdrawal of accumulated sewage from the well 4 into sewer pipe 2 is accomplished as follows.

Sewage enters through sewer pipe 5 and collects in the base of the well 4 until accumulated sewage level rises from level 34 to level 33.

Float 22 floats up within confining cage 6A with sewage accumulating in the well until valve 24 at the top of float 22 enters seat 23, preventing further atmospheric air entering conduit 27. Pressure in the enclosed space 17 falls towards the sewer pipe pressure and closed pinch valve 1A re-opens.

Sewage is withdrawn from the well into sewer pipes 3 and 2, and the sewage level in well 4 falls towards level 34. As the accumulated sewage level in well 4 falls, float 22 is suspended by both its buoyancy and the sub-atmospheric pressure in conduit 27, which holds valve 24 in its seat 23, until the increasing un-buoyed weight of the float overcomes the valve 24 suspension force and float 22 falls. Valve seat 23 opening is exposed, atmospheric pressure air enters conduits 27, 28 and 29 (but is throttled by flow-restricting device 31) and enclosed space 17, walls of the flexible sleeve 11 are drawn together and pinched closed by the sewer sub-atmospheric pressure, pinch valve 1A closes, and sewage ceases to be drawn from the well into the sewer pipe 3. Further accumulation of sewage in well 4 raises level 34 to 33 and the cycle is repeated.

Figure 20:
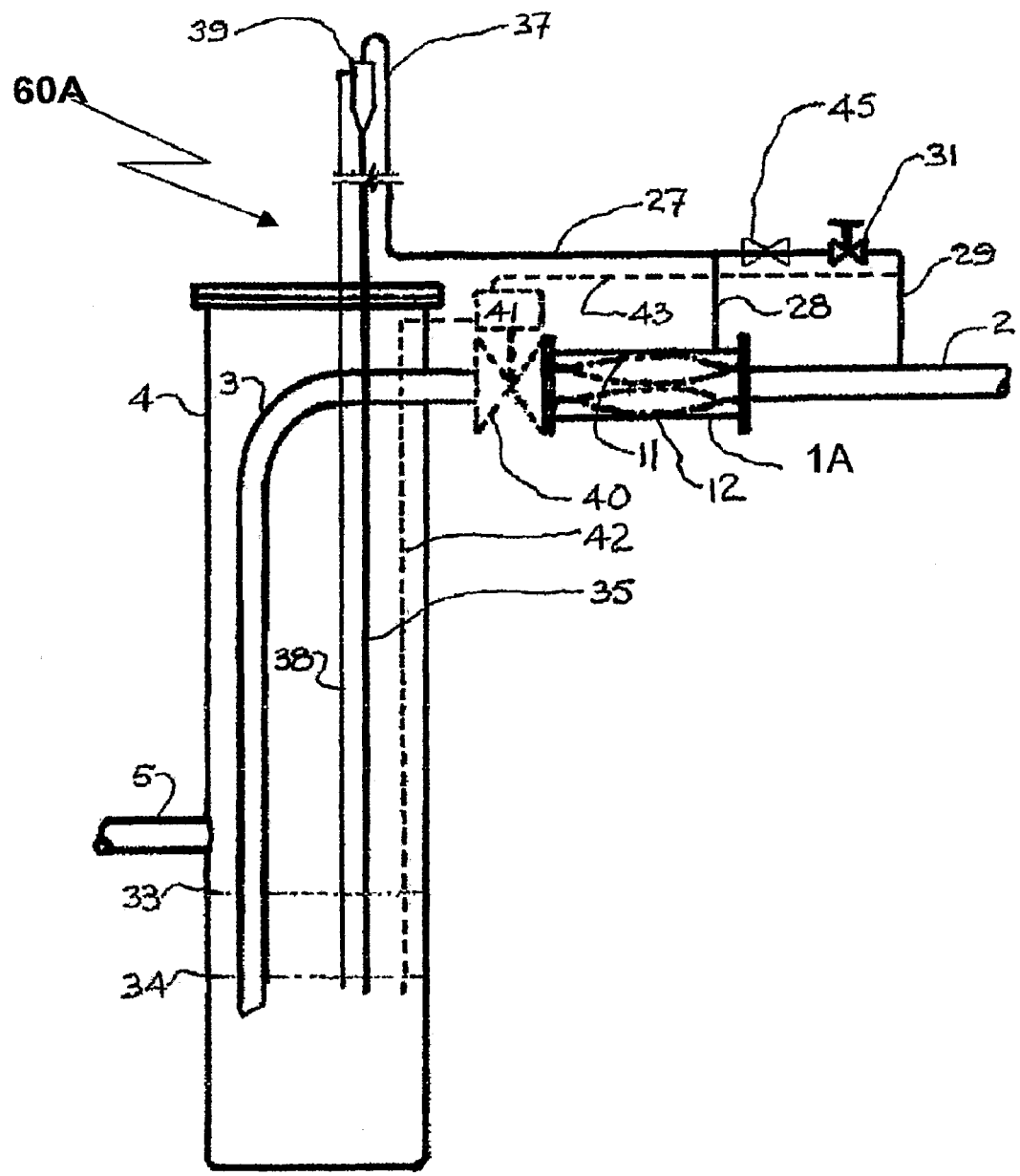
FIG. 20 is a schematic drawing showing an alternative embodiment to that of FIG. 19.

FIG. 20 is a schematic diagram showing an example of the application of an air pressure driven pinch valve to a vacuum-driven sewer system 60A where like numerals indicate features in common with FIG. 19.

In this example the means of controlling the entry or exclusion of atmospheric air from conduit 27 comprises a tall dip-pipe 35, which rises to a height above the expected maximum height (of the liquid column that can be supported by the expected minimum sub-atmospheric pressure in the sewer pipe 2), and remains submerged in the well 4 liquid until that level falls below level 34. The open bottom of the dip-pipe 35 is set at the minimum acceptable level that accumulated sewage in well 4 can be permitted to reach. Tube 37 connects the space within the dip-pipe 35 to tube 27. While the open bottom of the dip-pipe 35 remains submerged, liquid is drawn up into the dip-pipe 35 and pressure in the enclosed space 17 reaches and remains that of the sewer pipe 2, and pinch valve 1A remains open. Whenever the sewage level in well 4 falls below level 34, it exposes the open end of dip-pipe 35, atmospheric airs enters dip-pipe 35 and enclosed space 17, and pinch valve 1A closes.

FIG. 20 also shows (in ghost outline, with components indicated by the numbers 40, 41, 42 and 43) a prior art mechanically operated valve typical of those currently used in these sub-atmospheric pressure sewer systems.

Whenever the valve 40 fails to close properly (typically due to obstruction by debris) the sewage liquid level in the well 4 falls below the level 34, and the open bottom of the dip-pipe 35 is exposed. Sewage held in pipe 35 falls out, pressure in dip-pipe 35 rises to atmospheric, which transmits to tubes 37 and 27, and pinch valve 1A closes. Further influx of sewage into the well 4 (through the sewer pipe 5) increases the sewage level in the well from level 34 to level 33 when valve 40 opens releasing its obstruction, whereafter it continues periodically emptying well 4 until a further failure to close occurs. Manually operated valve 45 can be closed by servicing personnel to hold pinch valve 1A closed during a manual clearing of the valve 40.

In the example shown there is potential for entrained liquid to be drawn into the said enclosed space of the pinch valve 1A while liquid is falling within dip pipe 35. To minimize this, liquid-from-air separating vessel 39, and additional dip pipe 38 can be added as indicated. The bottom of the additional dip pipe 38 is placed slightly above the bottom of its neighboring pipe 35, and becomes exposed before that of pipe 35. When this occurs, air rises through dip pipe 38 while liquid falls in dip pipe 35, and the separating vessel 39 (which may be a cyclone) minimizes entrainment of liquid into tube 37.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

For example, the flanged ends of the flexible tubes may be omitted and the inlet and outlet ends sealing secured around stiff short length tubes cut to support the duck beak shape or star shape of the flexible tube when closed. These short tubes could support reinforcements embedded in or attached to the wall of the flexible tube.

The materials from which the flexible tube is constructed will preferably be a flexible and fatigue resistant elastomeric material such as a synthetic or natural rubber, and a knitted, or woven and bonded ligaments, or bonding-compatible, tensile strength resistant, abrasion and fatigue resistant fabric may be used where an embedded or attached reinforced fabric is required. Elsewhere metals or stiff fiber-reinforced plastics may be used.

The flexible tube may consist of several concentric flexible tubular layers. It may be wound from flat natural or synthetic rubber sheet or other sheet elastomeric material in several concentric boned layers, to reduce vulnerability to failure by puncture, without sacrificing flexibility, in which the inner layers may be made of a softer material or even coated with PTFE.

What is claimed is:

1. A valve comprising:
    a flexible tube having an inlet portion and an outlet portion;
    a spigot comprising a spigot inlet portion and a spigot outlet portion;
    the inlet portion of the flexible tube sealed relative to the spigot;
    wherein inner surfaces of the flexible tube outlet portion downstream of the spigot outlet portion close together when the valve is closed;
    at least one stiff reinforcement engaging the flexible tube and adapted to pivot at an inlet end so that an outlet end of the reinforcement moves toward and away from a centerline of the flexible tube; wherein the reinforcement reinforces the flexible tube against an externally applied pressure when the valve is closed;
    wherein the reinforcement is attached to an inner surface of the flexible member; wherein the spigot outlet portion comprises one or more inclined surfaces against which the flexible tube abuts when the valve is closed in the presence of backpressure.

2. A valve according to claim 1 wherein the reinforcement further comprises a stiff plate disposed outwardly of the flexible tube and coupled to the stiff reinforcement so as to move therewith.

3. A valve according to claim 1 wherein the outlet portion of the flexible tube is biased to a closed position.

4. A valve according to claim 3 wherein clamps bias the outlet portion of the flexible tube to a closed position; wherein the clamps are disposed on lateral sides of the flexible tube and positioned so as to allow expansion of a laterally central part of the flexible tube.

5. A valve according to claim 3 wherein stitching bias the outlet portion of the flexible tube to a closed position; wherein the stitching is disposed on lateral sides of the flexible tube and positioned so as to allow expansion of a laterally central part of the flexible tube.

6. The valve of claim 2 further comprising:
    a housing circumferentially surrounding the flexible tube; the housing comprising a movable diaphragm and a drive unit;
    an enclosed space circumferentially surrounding the flexible tube and circumferentially surrounded by the housing;
    the enclosed space partially bounded by the diaphragm;
    the inlet portion of the flexible tube sealingly affixed to a valve inlet of the housing;
    the outlet portion of the flexible tube sealingly affixed to a valve outlet of the housing;
    the drive unit mechanically connected to the diaphragm and operative to move the diaphragm inward toward the flexible tube to close the valve and outward away from the flexible tube to open the valve.

7. A valve according to claim 6 wherein the reinforcement further comprises a stiff plate disposed outwardly of the flexible tube and coupled to the stiff reinforcement so as to move therewith.

8. The valve of claim 1:
    further comprising a rigid valve body circumferentially surrounding the flexible tube; the rigid valve body having valve inlet and a valve outlet;
    the inlet portion of the flexible tube sealingly affixed to the valve inlet of the rigid valve body;
    the outlet portion of the flexible tube sealingly affixed to the valve outlet of the rigid valve body;
    an enclosed space defined between the rigid valve body and the flexible tube;
    an external fluid source operatively connected to the enclosed space such that fluid flow from the external fluid source to the enclosed space tends to close the valve and fluid flow to the external fluid source from the enclosed space tends to open the valve.

9. A valve according to claim 8 wherein the reinforcement further comprises a stiff plate disposed outwardly of the flexible tube and coupled to the stiff reinforcement so as to move therewith.

* * * * *